United States Patent
White (10) Patent No.: US 11,061,896 B2
(45) Date of Patent: Jul. 13, 2021

(54) MAXIMIZING OPERATOR PARALLELISM

(71) Applicant: salesforce.com, inc., San Francisco, CA (US)

(72) Inventor: Seth White, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 136 days.

(21) Appl. No.: 16/050,479

(22) Filed: Jul. 31, 2018

(65) Prior Publication Data

US 2019/0384843 A1 Dec. 19, 2019

Related U.S. Application Data (60) Provisional application No. 62/687,174, filed on Jun. 19, 2018.

(51) Int. Cl.
| | |
|---|---|
| *G06F 16/2453* | (2019.01) |
| *G06F 9/50* | (2006.01) |
| *G06F 9/48* | (2006.01) |
| *G06F 16/901* | (2019.01) |
| *G06F 16/2455* | (2019.01) |

(52) U.S. Cl.
CPC ...... *G06F 16/24532* (2019.01); *G06F 9/4881* (2013.01); *G06F 9/5022* (2013.01); *G06F 9/5038* (2013.01); *G06F 16/24553* (2019.01); *G06F 16/9024* (2019.01)

(58) Field of Classification Search
CPC .............. G06F 16/21; G06F 16/24537; G06F 16/24532; G06F 16/2462; G06F 16/2282; G06F 16/24539; G06F 16/273
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |

(Continued)

FOREIGN PATENT DOCUMENTS

WO  WO 2014/042729 A1 * 3/2014

OTHER PUBLICATIONS

Fjording the Stream: An Architecture for Queries over Streaming Sensor Data. Madden et al.; IEEE 2002.*

*Primary Examiner* — Daniel A Kuddus
(74) *Attorney, Agent, or Firm* — Dergosits & Noah LLP; Todd A. Noah (57) ABSTRACT

A system selects multiple operators in a query graph by determining whether a corresponding value satisfies a threshold for each operator. The system sorts each selected operator in an ascending order based on a corresponding maximum thread capacity and determines an average number of threads of control based on available threads and the selected operators. The system allocates an initial number of threads to an initial selected operator in the ascending order, the initial number based on a minimum of the average number of threads and corresponding maximum thread capacity. The system determines a revised average number of threads based on remaining number of available threads and remaining number of the selected operators and allocates a next number of threads to a next selected operator in the ascending order, the next number based on a minimum of the revised average number of threads and corresponding maximum thread capacity.

20 Claims, 4 Drawing Sheets

(56) References Cited

U.S. PATENT DOCUMENTS

| | | | |
|---|---|---|---|
| 5,649,104 A | 7/1997 | Carleton | |
| 5,715,450 A | 2/1998 | Ambrose et al. | |
| 5,734,884 A * | 3/1998 | Eberhard | G06F 11/34 |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,003,022 A * | 12/1999 | Eberhard | G06F 11/34 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,207,043 B2 * | 4/2007 | Blythe | G06F 9/505 718/104 |
| 7,237,242 B2 * | 6/2007 | Blythe | G06F 9/505 709/224 |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,730,478 B2 | 6/2010 | Weissman | |
| 7,779,039 B2 | 8/2010 | Weissman et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,529,626 B2 * | 12/2016 | Wang | G06F 9/50 |
| 9,772,890 B2 * | 9/2017 | Ekanadham | G06F 16/9024 |
| 9,778,967 B2 * | 10/2017 | Ekanadham | G06F 16/2379 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0139433 A1 * | 7/2004 | Blythe | G06F 9/505 718/100 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0081210 A1 * | 4/2005 | Day | G06F 9/5016 718/104 |
| 2005/0091098 A1 | 4/2005 | Brodersen et al. | |
| 2006/0122927 A1 * | 6/2006 | Huberman | G06Q 40/04 705/37 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0047144 A1 * | 2/2011 | Han | G06F 16/24532 707/718 |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0074641 A1 * | 3/2014 | Wang | G06Q 30/08 705/26.3 |

(56) References Cited

U.S. PATENT DOCUMENTS

| | | | |
|---|---|---|---|
| 2014/0075030 A1* | 3/2014 | Wang | H04L 43/08 709/226 |
| 2014/0359537 A1 | 12/2014 | Jakobson et al. | |
| 2015/0007050 A1 | 1/2015 | Jakobson et al. | |
| 2015/0046279 A1* | 2/2015 | Wang | G06F 3/0482 705/26.3 |
| 2015/0095162 A1 | 4/2015 | Jakobson et al. | |
| 2015/0172563 A1 | 6/2015 | Jakobson et al. | |
| 2016/0188656 A1* | 6/2016 | Ekanadham | G06F 16/2379 707/755 |
| 2017/0061364 A1* | 3/2017 | Waltz | G06F 16/2453 |
| 2018/0268031 A1* | 9/2018 | Barsness | G06F 16/21 |

* cited by examiner

MAXIMIZING OPERATOR PARALLELISM

CROSS REFERENCE TO RELATED APPLICATION

This application claims priority under 35 U.S.C. § 119 or the Paris Convention from U.S. Provisional Patent Application 62/687,174, filed Jun. 19, 2018, the entire contents of which is incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A query engine is a system that responds to an information request by retrieving information stored on a computer system, and then presenting the retrieved information. A query engine utilizes a query processor, which may be referred to as a query graph interpreter or an interpreter, to organize the operations required to respond to a query. An instance of an interpreter may have a hierarchical graph-like structure that includes nodes which represent the specific operations (such as scanning, grouping, aggregating, and projecting) required by the query being executed, with the shape of the instance of the interpreter being specific to the query that is being executed.

BRIEF SUMMARY

A query processor can introduce parallelism at the level of the individual operators that implement the nodes in a query graph. The query processor can decide how much parallelism should be given to each operator by determining the number of separate threads of control, which are each implemented by a processor core, to be allocated to particular operators in order to maximize performance. Although specific operators are used to illustrate examples for maximizing operator parallelism in a query processor, any types of operators may have their parallelism maximized in a query processor.

In accordance with embodiments, there are provided systems and methods for maximizing operator parallelism in a query processor. A system selects multiple operators in a query graph by determining for each operator whether the corresponding value satisfies the corresponding threshold. The system sorts each selected operator in an ascending order based on its corresponding maximum thread capacity. The system determines the average number of threads of control based on the number of available threads of control and the number of selected operators. The system allocates the initial number of threads of control to the initial selected operator in the ascending order, the initial number based on the minimum of the average number of threads of control and the corresponding maximum thread capacity. The system determines the revised average number of threads of control based on the remaining number of available threads of control and the remaining number of the selected operators. The system allocates the next number of threads of control to the next selected operator in the ascending order, the next number based on the minimum of the revised average number of threads of control and the corresponding maximum thread capacity.

For example, a query processor selects the operators MapGroupsInv, DimensionData (cardinality=1,000), and DimensionData (cardinality=500) in a query graph for parallelization because each of the values for these operators satisfies its selection threshold. The query processor sorts the operators in the following order: DimensionData (cardinality=500) has a maximum parallelization of 2 threads of control, DimensionData (cardinality=1,000) has a maximum parallelization of 4 threads of control, and MapGroupsInv has a maximum parallelization of an unlimited number of threads of control. The query processor determines that the initial number of threads of control available to the query is 12, the initial number of operators selected for parallelization is 3 [DimensionData (cardinality=500), DimensionData (cardinality=1,000), and MapGroupsInv], and the initial average number of threads of control available for each operator is 12 divided by 3, which equals 4 threads of control per operator. The query processor determines that since the average of 4 threads of control per operator is available for the operator DimensionData (cardinality=500), the DimensionData (cardinality=500) has a maximum parallelization of 2 threads of control, and the minimum of these numbers of threads of control is 2 threads of control, the query processor allocates 2 threads of control to the operator DimensionData (cardinality=500). The query processor determines that 10 threads of control are still available because 2 threads of control were allocated from the initial 12 threads of control, 2 operators selected for parallelization still remain without allocation of threads of control [DimensionData (cardinality=1,000) and MapGroupsInv] because the operator DimensionData (cardinality=500) has been allocated 2 threads of control, and the revised average number of threads of control available for each operator is 10 divided by 2, which equals 5 threads of control per operator. The query processor determines that since an average of 5 threads of control per operator is available for the operator DimensionData (cardinality=1,000), the DimensionData (cardinality=1,000) has a maximum parallelization of 4 threads of control, and the minimum of these numbers of threads of control is 4 threads of control, the query processor allocates 4 threads of control to the operator DimensionData (cardinality=1,000). The query processor determines that 6 threads of control are still available because 6 threads of control were allocated from the initial 12 threads of control, 1 operator selected for parallelization remains without allocation of threads of control [MapGroupsInv] because the operator DimensionData (cardinality=500) has been allocated 2 threads of control and the operator DimensionData (cardinality=1,000) has been allocated 4 threads of control, and the revised average number of threads of control available for each operator is 6 divide by 1, which equals 6 threads of control per operator. The query processor determines that since an average of 6 threads of control per operator is available for the operator MapGroupsInv, the operator MapGroupsInv has a maximum parallelization of an unlimited number of threads of control, and the minimum of these numbers of threads of control is 6 threads of control, the query processor allocates the remaining 6 threads of control to the operator MapGroupsInv.

In this example, the query processor assigns each DimensionData operator the maximum number of threads of control that each operator is allowed to use based on its cardinality (2 and 4), and then assigns the remaining 6 threads of control to the operator MapGroupsInv, which has no constraints on its parallelism. Since at each iteration the query processor evaluates the operator which can use the smallest number of threads of control, the maximum number of threads of control remains at the next iteration for the remaining operators to use, and the remaining operators are those which have the greatest ability to use the remaining threads of control. Therefore, the query processor performs an optimal assignment of threads of control, given the assumptions about the system.

While one or more implementations and techniques are described with reference to an embodiment in which maximizing operator parallelism in a query processor is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for maximizing operator parallelism in a query processor. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for maximizing operator parallelism in a query processor will be described with reference to example embodiments. The following detailed description will first describe a method for maximizing operator parallelism in a query processor.

Figure 1A:
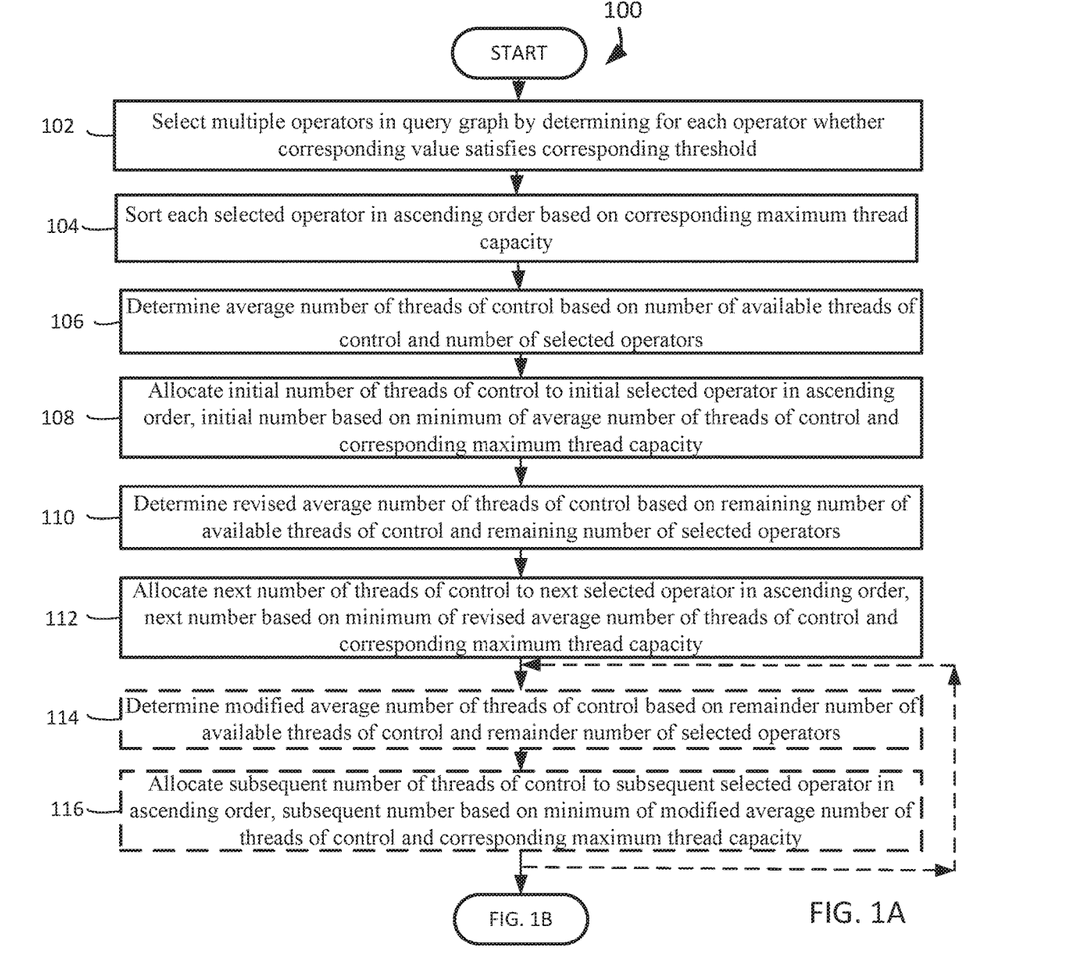
FIGS. 1A-B depict an operational flow diagram illustrating a high-level overview of a method for maximizing operator parallelism in a query processor, in an embodiment.
Figure 1B:
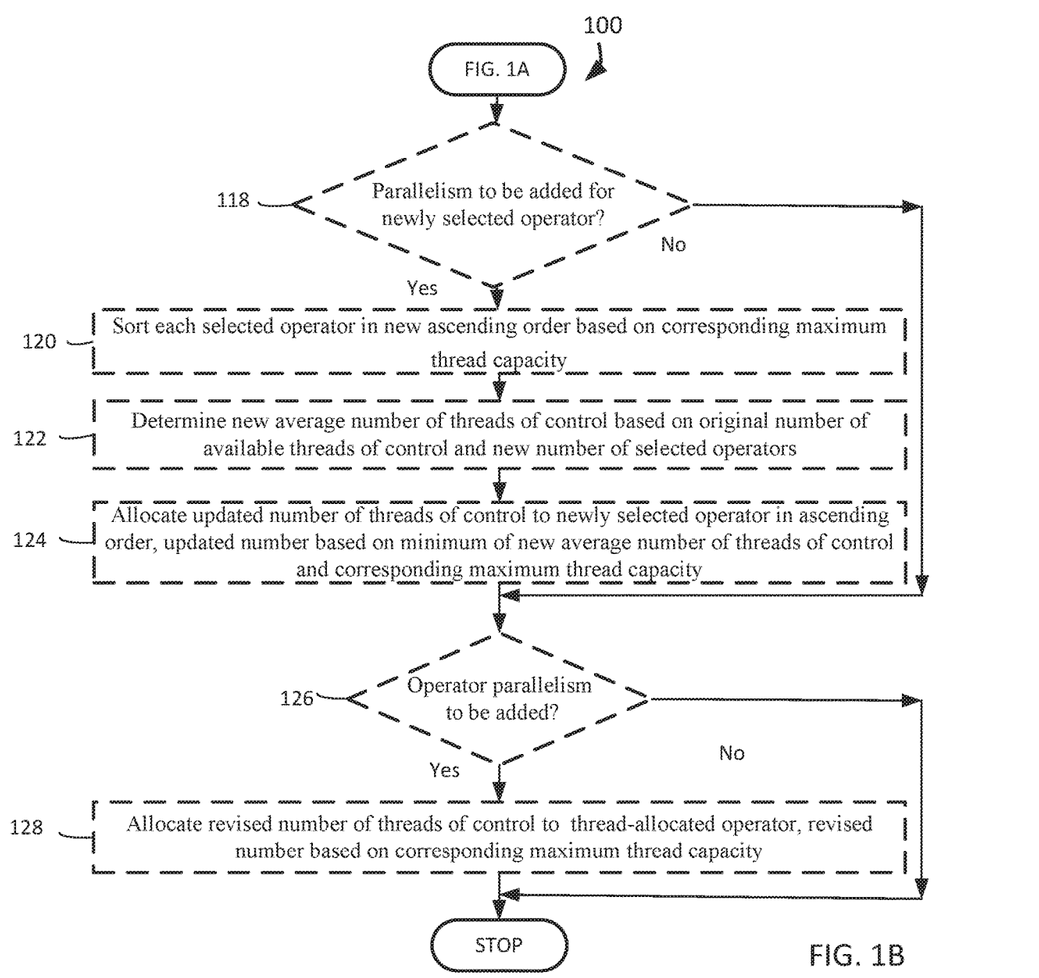

FIGS. 1A-B are an operational flow diagram illustrating a high-level overview of a method 100 for maximizing operator parallelism in a query processor. The method 100 may be implemented on either a centralized computing platform or in parallel on a distributed computing platform.

A query processor selects operators that will be parallelized during query optimization, which is before query execution begins. In theory, the query processor may parallelize any operator, but in practice certain operators may benefit more from parallelization. Therefore, the query processor has a policy that it applies to a query graph to determine which nodes, or the operators that implement the nodes, will be accelerated using parallelization by being given more processor resources, or processor cores that implement threads of control. During query optimization, the query processor traverses the query graph and applies a policy to each node, or its operator.

Multiple operators in a query graph are selected by determining for each operator whether the corresponding value satisfies the corresponding threshold, block 102. The system selects operators to be parallelized. For example, and without limitation, this can include the query processor selecting the operators MapGroupsInv, DimensionData (cardinality=1,000), and DimensionData (cardinality=500) in a query graph for parallelization because each of these operator's value satisfies its selection threshold. For example, the query processor determines whether the dimension for a DimensionData operator (which performs a dimension scan) is higher than a dimension threshold, because the cardinality must be high enough so that two threads of control—the minimum number of threads of control that will be used for parallelization—will each have at least 64 elements to scan. In another example, the query processor determines whether the limit for a limit query (such as a query that returns a set number of rows as the output) is above a limit threshold, because a query that returns a single row is not a good candidate for parallelization. In yet another example, the query processor determines whether the size of an operator's input data stream is greater than an input data stream threshold, because queries over small amounts of data execute very quickly without parallelization, such that these queries do not benefit as much, and may even be impacted negatively, by the additional overhead for setting up and tearing down parallelism. In a further example, the query processor determines whether the cardinality of the left child stream for a CrossIsectLeft operator is beyond a certain threshold, because each thread of control must have at least one element to process. A query processor can use similar policies for other operator types, including CrossIsectDimIndex, CrossIsectDimIdxCnt, and MapGroupsInv. A maximum of maxThreads/2 operators is parallelized since each operator must have at least two threads of control for parallelization to occur. There are multiple methods to handle the case where the number of operators exceeding their thresholds is greater than the number of operators that can be parallelized with at least two threads of control each. One such method is to only parallelize operators with the n highest threshold values. In these examples, the maximum level of parallelism for the DimensionData operators is proportional to their cardinality, such as the maximum equals the cardinality divided by 250, which would ensure that each thread of control has 250 elements to process, except possibly for the final thread of control. The MapGroupsInv operator has no restriction on its parallelization level because it is infinite.

An operator can be a computer program function. A query graph can be a hierarchical structure that includes nodes which represent the specific operations required by the information retrieval request being executed. A value can be a numerical amount denoted by an algebraic term; a magnitude, quantity, or number. A threshold can be the magnitude that must be satisfied for a certain reaction, phenomenon, result, or condition to occur or be manifested. A size can be the relative extent of something, a thing's overall dimensions or magnitude, or how big something is. An input data stream can be a sequence of digitally encoded coherent signals used to receive information that is in the process of being transmitted. A dimension can be a string-valued column in a table. A cardinality can be the number of unique string values that occur. Dimensions are stored in an inverted list format that looks like: <dim value1>: rowid11, rowid12, rowid13, . . . <dim value2>: rowid21, rowid22, rowid23, . . . . Often hundreds of millions of row identifiers are associated with the same dimension value. Processing these lists of row identifiers is what the system wants to do in parallel. Such processing typically involves doing set intersection operations and set union operations, which are intensive for central processing units. A child stream can be a sequence of digitally encoded coherent signals used by a derived object to transmit or receive information that is in the process of being transmitted. A query limit can be a restriction on the size or amount of an information retrieval request.

However, some operators may not be able to use as many threads of control as other operators because of limitations on their expected input size. Therefore, the query processor sorts the selected operators in ascending order by the maximum number of threads of control that they can use. This ensures that an operator O whose maximum number of threads of control is smaller than another operator P is allocated threads of control before operator P is allocated threads of control. The ordering also ensures that the maximum number of threads of control is available for each operator to use, which results in each operator being assigned the greatest amount possible, which is the maximum parallelism for the operator, given the system constraints and the operator's capacity to use parallelism.

After selecting the operators, each selected operator is sorted in an ascending order based on its corresponding maximum thread capacity, block 104. The system sorts the selected operators from the operator with the lowest maximum parallelization capacity to the operator with the highest maximum parallelization capacity. By way of example and without limitation, this can include the query processor sorting the operators in the following order: DimensionData (cardinality=500) has a maximum parallelization of 2 threads of control, DimensionData (cardinality=1,000) has a maximum parallelization of 4 threads of control, and MapGroupsInv has a maximum parallelization of an unlimited number of threads of control. A selected operator can be a computer program function chosen as being suitable. An ascending order can be an arrangement from the smallest number to the largest number. A maximum thread capacity can be a highest permitted amount of implementation by processor cores.

The query engine gives each query a resource limit which is the maximum number of threads of control that the query is allowed to use. For example, if this resource limit is set to 12 in an environment, then a query can use up to a maximum of 12 processor cores at any one time on a host when the query is executed. The query engine may use a policy to set this maximum limit, and this maximum limit may be different for each query. The factors that influence the maximum limit include the number of processors and the number of cores that each processor has on the computer used to execute a query, the number of queries that are expected to be executing concurrently when a query executes, and the number of cores that a query can reasonably be expected to benefit from using, which may be different for each query.

Having sorted the selected operators, the average number of threads of control is determined based on the number of available threads of control and the number of selected operators, block 106. The system determines the average number of threads of control that are available for each selected operator. In embodiments, this can include the query processor determining that the initial number of threads of control available to the query is 12, the initial number of operators selected for parallelization is 3 [DimensionData (cardinality=500), DimensionData (cardinality=1, 000), and MapGroupsInv], and the initial average number of threads of control available for each operator is 12 divided by 3, which equals 4 threads of control per operator.

A number can be an arithmetical value, expressed by a word, symbol, or figure, representing a particular quantity, and used in counting and making calculations and for showing order in a series or for identification. An average number can be an arithmetical value expressing the central or typical value in a set of data, in particular the mode, median, or most commonly the mean. A query can be an information retrieval request. A computer can be an electronic device for storing and processing data, typically in binary form, according to instructions given to it in a variable program. A processor can be the part of a computer in which operations are controlled and executed. A core can be an independent processing unit that executes on a processor. A thread of control can be a processor core. An available thread can a processor core that is ready for use.

Following the determination of the average number of threads of control, the initial number of threads of control is allocated to the initial selected operator in the ascending order, the initial number based on the minimum of the average number of threads of control and the corresponding maximum thread capacity, block 108. The system allocates the optimal number of threads of control to the operator with the lowest maximum capacity for threads of control. For example, and without limitation, this can include the query processor determining that since an average of 4 threads of control per operator is available for the operator DimensionData (cardinality=500), the DimensionData (cardinality=500) has a maximum parallelization of 2 threads of control, and the minimum of these numbers of threads of control is 2 threads of control, the query processor allocates 2 threads of control to the operator DimensionData (cardinality=500). An initial number can be an arithmetical value. An initial selected operator can be a computer program function chosen as being suitable. A minimum can be the least or smallest amount or quantity possible, attainable, or required.

After allocating some threads of control to an operator, the revised average number of threads of control is determined based on the remaining number of available threads of control and the remaining number of selected operators, block 110. The system recalculates the average number of threads of control per operator after assigning some threads of control to the operator with the lowest maximum capacity for threads of control. By way of example and without limitation, this can include the query processor determining that 10 threads of control are still available because 2 threads of control were allocated from the initial 12 threads of control, 2 operators selected for parallelization still remain without allocation of threads of control [DimensionData (cardinality=1,000) and MapGroupsInv] because the operator DimensionData (cardinality=500) has been allocated 2 threads of control, and the revised average number of threads of control available for each operator is 10 divided by 2, which equals 5 threads of control per operator. A revised average number can be an arithmetical value expressing the central or typical value in a set of data, in particular the mode, median, or most commonly the mean. A remaining number can be an arithmetical value of a thing that is not used yet.

Having determined the revised average number of threads of control, the next number of threads of control is allocated to the next selected operator in the ascending order, the next number based on the minimum of the revised average number of threads of control and the corresponding maximum thread capacity, block 112. The system allocates the optimal number of threads of control to the operator with the next lowest maximum capacity for threads of control. In embodiments, this can include the query processor determining that since the average of 5 threads of control per operator is available for the operator DimensionData (cardinality=1,000), the DimensionData (cardinality=1,000) has a maximum parallelization of 4 threads of control, and the minimum of these numbers of threads of control is 4 threads of control, the query processor allocates 4 threads of control to the operator DimensionData (cardinality=1,000). A next number can be an arithmetical value. A next selected operator can be a computer program function chosen as being suitable.

Following the additional allocation of threads of control to another operator, the modified average number of threads of control is optionally determined based on the remainder number of available threads of control and the remainder number of the selected operators, block 114. The system recalculates the average number of threads of control per operator after assigning some threads of control to the operator with the next lowest maximum capacity for threads of control. For example, and without limitation, this can include the query processor determining that 6 threads of control are still available because 6 threads of control were allocated from the initial 12 threads of control, 1 operator selected for parallelization remains without allocation of threads of control [MapGroupsInv] because the operator DimensionData (cardinality=500) has been allocated 2 threads of control and the operator DimensionData (cardinality=1,000) has been allocated 4 threads of control, and the revised average number of threads of control available for each operator is 6 divided by 1, which equals 6 threads of control per operator. A modified average number can be an arithmetical value expressing the central or typical value in a set of data, in particular the mode, median, or most commonly the mean. A remainder number can be an arithmetical value of a thing that is not used yet.

After determining the modified average number of threads of control, the subsequent number of threads of control is optionally allocated to the subsequent selected operator in the ascending order, the subsequent number based on the minimum of the modified average number of threads of control and the corresponding maximum thread capacity, block 116. The system allocates the optimal number of threads of control to the operator with the next lowest maximum capacity of threads of control. By way of example and without limitation, this can include the query processor determining that since the average of 6 threads of control per operator is available for the operator MapGroupsInv, the operator MapGroupsInv has a maximum parallelization of an unlimited number of threads of control, and the minimum of these numbers of threads of control is 6 processor cores, the query processor allocates 6 threads of control to the operator MapGroupsInv. Although blocks 108, 112, and 116 describe examples of allocating threads of control to two operators or three operators, the method 100 can loop back to block 114 to determine the number of threads of control to allocate and allocate these threads for any number of additional operators. A subsequent number can be an arithmetical value. A subsequent selected operator can be a computer program function chosen as being suitable.

The query processor can allocate threads of control during query optimization, but there are occasions when the query processor will add parallelization to a query dynamically during query execution when the query processor determines that parallelism is advantageous based on the portion of the data that has been processed. The query processor can re-allocate the threads of control to all of the selected operators, including any operators that were newly selected during query execution for parallelization, thereby adjusting the parallelization level of all the operators dynamically, which includes notifying threads of control that they need to shut down, and allocating new threads of control to any newly selected operators.

A determination is optionally made whether parallelism is to be added for a newly selected operator, based on the portion of data processed during query execution, block 118. The system determines during query execution whether an operator that was not previously selected for parallelization is now selected for parallelization. In embodiments, this can include the query processor determining whether the portion of the data that has been processed during query execution indicates that the value of the RowRange operator now exceeds its selection threshold. If parallelism is to be added for a newly selected operator, the method 100 continues to the block 120 to sort all of the selected operators, including the newly selected RowRange operator. If parallelism is not to be added for a newly selected operator, the method 100 proceeds to the block 126 to determine whether any operator parallelism is to be added. Parallelism can be a type of computation in which many calculations or the execution of processes are carried out concurrently. A newly selected operator can be a computer program function chosen as being suitable. A portion can be a part of a whole. Data processed can be information operated on by a computer. Query execution can be a computer performing at least a part of an information retrieval request.

If parallelism is to be added for a newly selected operator, each selected operator is optionally sorted in a new ascending order based on its corresponding maximum thread capacity, block 120. The system sorts the selected operators, including any newly selected operators, from the operator with the lowest maximum parallelization capacity to the operator with the highest maximum parallelization capacity. For example, and without limitation, this can include the query processor sorting the operators in the following order: RowRange has a maximum parallelization of 2 threads of control, DimensionData (cardinality=500) has a maximum parallelization of 2 threads of control, DimensionData (cardinality=1,000) has a maximum parallelization of 4 threads of control, and MapGroupsInv has a maximum parallelization of an unlimited number of threads of control. A new ascending order can be an arrangement from the smallest number to the largest number.

Having sorted the selected operators, including any newly selected operators, the new average number of threads of control is optionally determined based on the original number of available threads of control and the new number of the selected operators, block 122. The system determines the average number of threads of control that are available for each selected operator, including the newly selected operator. By way of example and without limitation, this can include the query processor determining that the original number of threads of control available to the query is 12, the new number of operators selected for parallelization is 4 [RowRange, DimensionData (cardinality=500), DimensionData (cardinality=1,000), and MapGroupsInv], and the new average number of threads of control available for each operator is 12 divided by 4, which equals 3 threads of control per operator. A new average number can be an arithmetical value expressing the central or typical value in a set of data, in particular the mode, median, or most commonly the mean. An original number can be an arithmetical value. A new number can be an arithmetical value.

After determining the new average number of threads of control, the updated number of threads of control is optionally allocated to a newly selected operator in the ascending order, the updated number based on the minimum of the new average number of threads of control and the corresponding maximum thread capacity, block 124. The system allocates the optimal number of threads of control to the newly selected operator. In embodiments, this can include the query operator determining that since an average of 3 threads of control per operator is available for the operator RowRange the operator RowRange has a maximum parallelization of 2 threads of control, and the minimum of these numbers of threads of control is 2 threads of control, the query processor allocates 2 threads of control to the operator RowRange. An updated number can be an arithmetical value.

The query processor can also ignore the limit on the number of threads of control, and then assign the operators some number of threads of control based on their maximum level of parallelization. A determination is optionally made whether operator parallelism is to be added, block 126. The determines during query execution whether an operator that was previously selected for parallelization is now selected for additional parallelization. For example, and without limitation, this can include the query processor determining whether the portion of the data that has been processed during query execution indicates that the DimensionData (cardinality=1,000) operator can benefit from the allocation of additional threads of control. If parallelism is to be added for a previously selected operator, the method 100 continues to the block 128 to determine the operator parallelism to be added. If parallelism is not to be added for a previously selected operator, the method 100 stops. Operator parallelism can be when instances of a computer program function are executed concurrently.

If parallelism is to be added for a previously selected operator, the revised number of threads of control is optionally allocated to a thread-allocated operator, the revised number based on the corresponding maximum thread capacity, block 128. The system allocates a different number of threads of control to an operator than were allocated to the operator during query optimization. By way of example and without limitation, this can include the query processor allocating 4 threads of control to the operator DimensionData (cardinality=1,000) during query execution time, after the availability of only 5 threads of control during query optimization time resulted in the operator DimensionData (cardinality=500) being allocated 2 threads of control and the operator DimensionData (cardinality=1,000) being allocated only 3 threads of control. A revised number can be an arithmetical value. A thread-allocated operator can be a computer program function to which a processor core is assigned to implement.

The method 100 may be repeated as desired. Although this disclosure describes the blocks 102-128 executing in a particular order, the blocks 102-128 may be executed in a different order. In other implementations, each of the blocks 102-128 may also be executed in combination with other blocks and/or some blocks may be divided into a different set of blocks.

System Overview

Figure 2:
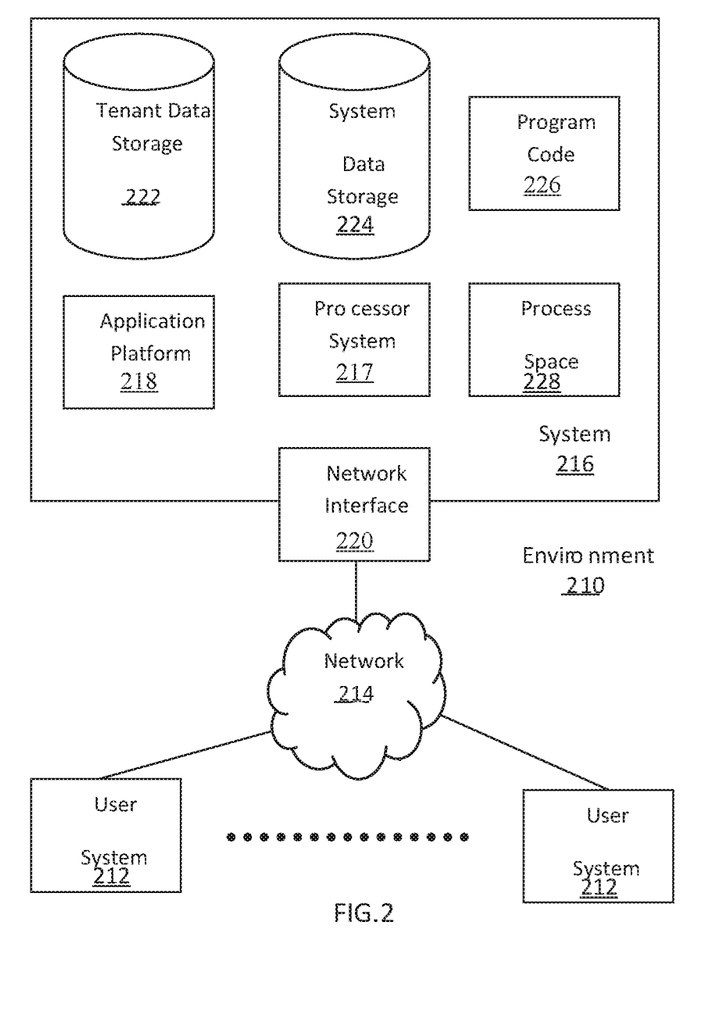
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 4) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 3:
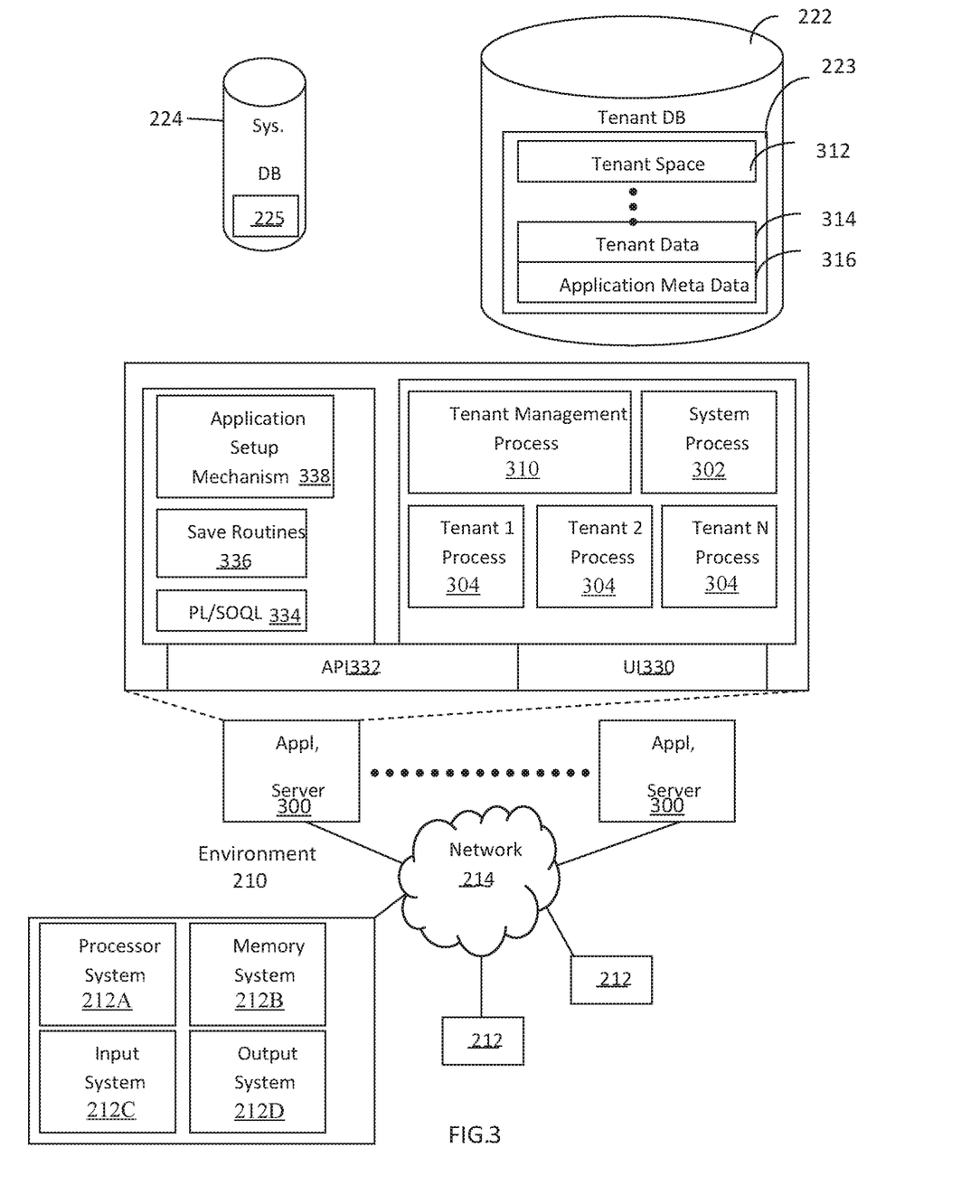
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers 300₁-300N, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which may be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server 300i might be coupled via the network 214 (e.g., the Internet), another application server 300N-1 might be coupled via a direct network link, and another application server 300N might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also may be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
select each operator in a query graph having a corresponding value that satisfies a corresponding threshold;
sort each selected operator in an ascending order based on a corresponding maximum thread capacity, the maximum thread capacity being the highest predetermined number of threads implemented in parallel by an operator;
determine an average number of threads of control that are available for each of the selected operators based on a number of currently available threads of control and a number of the selected operators;
allocate an initial number of threads of control to an initial selected operator having the lowest maximum thread capacity in the ascending order, the initial number being a plurality of threads of control and based on a minimum of the average number of threads of control and the corresponding maximum thread capacity;
determine a revised average number of threads of control that are available for each of the remaining selected operators based on a remaining number of currently available threads of control and a remaining number of the selected operators; and
allocate a next number of threads of control to a next selected operator having the next lowest maximum thread capacity in the ascending order, the next number being another plurality of threads of control and based on a minimum of the revised average number of threads of control and the corresponding maximum thread capacity, the allocated threads of control being configured to execute concurrently a query corresponding to the query graph.

2. The system of claim 1, wherein the corresponding threshold comprises one of a size of an input data stream, a cardinality of a dimension, a cardinality of a child stream, and a query limit.

3. The system of claim 1, wherein the number of available threads of control is based on at least one of a query corresponding to the query graph, a number of processors on a computer scheduled to execute the query, a number of cores corresponding to the number of processors, and a number of queries that are scheduled to be executing concurrently with the query.

4. The system of claim 1, comprising further instructions, which when executed, cause the one or more processors to:
determine a modified average number of threads of control based on a remainder number of available threads of control and a remainder number of the selected operators; and
allocate a subsequent number of threads of control to a subsequent selected operator in the ascending order, the subsequent number based on a minimum of the modified average number of threads of control and the corresponding maximum thread capacity.

5. The system of claim 1, comprising further instructions, which when executed, cause the one or more processors to:
determine whether parallelism is to be added for a newly selected operator, based on a portion of data processed during query execution;
sort each selected operator in a new ascending order based on the corresponding maximum thread capacity, in response to a determination that parallelism is to be added for the newly selected operator;
determine a new average number of threads of control based on an original number of available threads of control and a new number of the selected operators; and
allocate an updated number of threads of control to the newly selected operator in the ascending order, the updated number based on a minimum of the new average number of threads of control and the corresponding maximum thread capacity.

6. The system of claim 5, wherein allocating the updated number of threads of control to the newly selected operator comprises shutting down a thread previously allocated to a previously selected operator.

7. The system of claim 1, comprising further instructions, which when executed, cause the one or more processors to:
determine whether operator parallelism is to be added, based on a portion of data processed during query execution; and
allocate a revised number of threads of control to a thread-allocated operator, in response to a determination that operator parallelism is to be added, the revised number based on the corresponding maximum thread capacity.

8. A computer program product comprising computer-readable program code to be executed by one or more processors when retrieved from a non-transitory computer-readable medium, the program code including instructions to:
select each operator in a query graph having a corresponding value that satisfies a corresponding threshold;
sort each selected operator in an ascending order based on a corresponding maximum thread capacity, the maximum thread capacity being the highest predetermined number of threads implemented in parallel by an operator;
determine an average number of threads of control that are available for each of the selected operators based on a number of currently available threads of control and a number of the selected operators;
allocate an initial number of threads of control to an initial selected operator having the lowest maximum thread capacity in the ascending order, the initial number being a plurality of threads of control and based on a minimum of the average number of threads of control and the corresponding maximum thread capacity;
determine a revised average number of threads of control that are available for each of the remaining selected operators based on a remaining number of currently available threads of control and a remaining number of the selected operators; and
allocate a next number of threads of control to a next selected operator having the next lowest maximum thread capacity in the ascending order, the next number being a plurality of threads of control and based on a minimum of the revised average number of threads of control and the corresponding maximum thread capacity, the allocated threads of control being configured to execute concurrently a query corresponding to the query graph.

9. The computer program product of claim 8, wherein the corresponding threshold comprises one of a size of an input data stream, a cardinality of a dimension, a cardinality of a child stream, and a query limit.

10. The computer program product of claim 8, wherein the number of available threads of control is based on at least one of a query corresponding to the query graph, a number of processors on a computer scheduled to execute the query, a number of cores corresponding to the number of processors, and a number of queries that are scheduled to be executing concurrently with the query.

11. The computer program product of claim 8, wherein the program code comprises further instructions to:
   determine a modified average number of threads of control based on a remainder number of available threads of control and a remainder number of the selected operators; and
   allocate a subsequent number of threads of control to a subsequent selected operator in the ascending order, the subsequent number based on a minimum of the modified average number of threads of control and the corresponding maximum thread capacity.

12. The computer program product of claim 8, wherein the program code comprises further instructions to:
   determine whether parallelism is to be added for a newly selected operator, based on a portion of data processed during query execution;
   sort each selected operator in a new ascending order based on the corresponding maximum thread capacity, in response to a determination that parallelism is to be added for the newly selected operator;
   determine a new average number of threads of control based on an original number of available threads of control and a new number of the selected operators; and
   allocate an updated number of threads of control to the newly selected operator in the ascending order, the updated number based on a minimum of the new average number of threads of control and the corresponding maximum thread capacity, wherein allocating the updated number of threads of control to the newly selected operator comprises shutting down a thread previously allocated to a previously selected operator.

13. The computer program product of claim 8, wherein the program code comprises further instructions to:
   determine whether operator parallelism is to be added, based on a portion of data processed during query execution; and
   allocate a revised number of threads of control to a thread-allocated operator, in response to a determination that operator parallelism is to be added, the revised number based on the corresponding maximum thread capacity.

14. A method comprising:
   selecting each operator in a query graph having a corresponding value that satisfies a corresponding threshold;
   selecting each operator in a query graph having a corresponding value that satisfies a corresponding threshold;
   sorting each selected operator in an ascending order based on a corresponding maximum thread capacity, the maximum thread capacity being the highest predetermined number of threads implemented in parallel by an operator;
   determining an average number of threads of control that are available for each of the selected operators based on a number of currently available threads of control and a number of the selected operators;
   allocating an initial number of threads of control to an initial selected operator having the lowest maximum thread capacity in the ascending order, the initial number being a plurality of threads of control and based on a minimum of the average number of threads of control and the corresponding maximum thread capacity;
   determining a revised average number of threads of control that are available for each of the remaining selected operators based on a remaining number of currently available threads of control and a remaining number of the selected operators; and
   allocating a next number of threads of control to a next selected operator having the next lowest maximum thread capacity in the ascending order, the next number being a plurality of threads of control and based on a minimum of the revised average number of threads of control and the corresponding maximum thread capacity, the allocated threads of control being configured to execute concurrently a query corresponding to the query graph.

15. The method of claim 14, wherein the corresponding threshold comprises one of a size of an input data stream, a cardinality of a dimension, a cardinality of a child stream, and a query limit.

16. The method of claim 14, wherein the number of available threads of control is based on at least one of a query corresponding to the query graph, a number of processors on a computer scheduled to execute the query, a number of cores corresponding to the number of processors, and a number of queries that are scheduled to be executing concurrently with the query.

17. The method of claim 14, the method further comprising:
   determining a modified average number of threads of control based on a remainder number of available threads of control and a remainder number of the selected operators; and
   allocating a subsequent number of threads of control to a subsequent selected operator in the ascending order, the subsequent number based on a minimum of the modified average number of threads of control and the corresponding maximum thread capacity.

18. The method of claim 14, the method further comprising:
   determining whether parallelism is to be added for a newly selected operator, based on a portion of data processed during query execution;
   sorting each selected operator in a new ascending order based on the corresponding maximum thread capacity, in response to a determination that parallelism is to be added for the newly selected operator;
   determining a new average number of threads of control based on an original number of available threads of control and a new number of the selected operators; and
   allocating an updated number of threads of control to the newly selected operator in the ascending order, the updated number based on a minimum of the new average number of threads of control and the corresponding maximum thread capacity.

19. The method of claim 18, wherein allocating the updated number of threads of control to the newly selected operator comprises shutting down a thread previously allocated to a previously selected operator.

20. The method of claim 14, the method further comprising:
   determining whether operator parallelism is to be added, based on a portion of data processed during query execution; and
   allocating a revised number of threads of control to a thread-allocated operator, in response to a determination that operator parallelism is to be added, the revised number based on the corresponding maximum thread capacity.

* * * * *